United States Patent
Edler et al.

(10) Patent No.: US 8,491,231 B2
(45) Date of Patent: Jul. 23, 2013

(54) TOOL FOR CHIP REMOVING MACHINING AS WELL AS A SOLID INDEXABLE CUTTING INSERT AND A SOLID BASIC BODY THEREFOR

(75) Inventors: Daniel Edler, Sandviken (SE); Kjell Englund, Valbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 501 days.

(21) Appl. No.: 12/797,239

(22) Filed: Jun. 9, 2010

(65) Prior Publication Data
US 2010/0329800 A1 Dec. 30, 2010

(30) Foreign Application Priority Data
Jun. 24, 2009 (SE) .................................. 0900865

(51) Int. Cl.
*B23B 27/16* (2006.01)

(52) U.S. Cl.
USPC ............................ 407/103; 407/113; 407/114

(58) Field of Classification Search
USPC ............. 407/113, 114, 117, 101, 102, 103, 407/104, 105, 106, 107, 111, 112
IPC ....................................................... B23B 27/16
See application file for complete search history.

(56) References Cited

U.S. PATENT DOCUMENTS

| 3,268,977 | A | * | 8/1966 | Diemond | 407/5 |
| 3,310,859 | A | * | 3/1967 | Diemond et al. | 407/104 |
| 4,334,808 | A | * | 6/1982 | Seidel | 407/114 |
| 4,411,565 | A | * | 10/1983 | Hazra et al. | 407/114 |
| 4,632,606 | A | | 12/1986 | Lagerberg | |
| 4,632,608 | A | * | 12/1986 | Blomberg et al. | 407/114 |
| 5,765,972 | A | * | 6/1998 | Ericksson et al. | 407/114 |
| 6,988,858 | B2 | * | 1/2006 | Gates et al. | 407/100 |
| 7,179,021 | B2 | * | 2/2007 | Shaheen | 407/107 |
| 7,182,555 | B2 | * | 2/2007 | Kitagawa et al. | 407/113 |

(Continued)

FOREIGN PATENT DOCUMENTS

| EP | 0 162 029 | 11/1985 |
| EP | 161505 A1 * | 11/1985 |

(Continued)

OTHER PUBLICATIONS

European Search Report for Application No. 10792411.0, dated Nov. 7, 2012.

*Primary Examiner* — Daniel Howell
*Assistant Examiner* — Nicole N Ramos
(74) *Attorney, Agent, or Firm* — Morgan, Lewis & Bockius LLP (57) ABSTRACT

Tool for chip removing machining includes a basic body having an insert seat, and an indexable cutting insert fixed in the seat. The insert includes two cutting edges and at least two heads spaced-apart via an intermediate part and individually include a front portion having at least one cutting edge and a rear portion along which a pair of side contact surfaces are formed. The insert seat includes a front cavity including a pair of side support surfaces against which side contact surfaces of the cutting insert are pressed. The basic body is formed integrally of steel material and the seat is countersunk in the basic body so side support surfaces are integrated in the steel material. The cutting insert is formed integrally from a second, hard-wearing material having at least the same hardness as cemented carbide, the side contact surfaces of the insert being integrated in the second material.

24 Claims, 6 Drawing Sheets

U.S. PATENT DOCUMENTS

| | | | |
|---|---|---|---|
| 7,347,650 B2 * | 3/2008 | Tipu | 407/105 |
| 7,422,395 B2 * | 9/2008 | Huang | 407/107 |
| 7,632,046 B2 * | 12/2009 | Andersson et al. | 407/46 |
| 2006/0257216 A1 * | 11/2006 | Kimura et al. | 407/104 |
| 2009/0285646 A1 * | 11/2009 | Oprasic et al. | 407/114 |
| 2009/0290945 A1 * | 11/2009 | Carl | 407/113 |
| 2010/0303562 A1 | 12/2010 | Hecht | |
| 2010/0316454 A1 * | 12/2010 | Zitzlaff et al. | 407/99 |

FOREIGN PATENT DOCUMENTS

| | | |
|---|---|---|
| EP | 577573 A1 * | 1/1994 |
| EP | 579963 A1 * | 1/1994 |
| EP | 710517 A2 * | 5/1996 |
| EP | 1 795 288 | 6/2007 |
| EP | 1 935 538 | 6/2008 |
| EP | 2050529 A2 * | 4/2009 |
| JP | 2002307209 A * | 10/2002 |
| JP | 2004-42157 | 2/2004 |
| JP | 2004042157 A * | 2/2004 |
| JP | 2008155366 A * | 7/2008 |
| WO | 98/01249 | 1/1998 |
| WO | WO 9801249 A1 * | 1/1998 |
| WO | WO 9934947 A1 * | 7/1999 |
| WO | 2005/072898 | 8/2005 |

* cited by examiner

TOOL FOR CHIP REMOVING MACHINING AS WELL AS A SOLID INDEXABLE CUTTING INSERT AND A SOLID BASIC BODY THEREFOR

This application claims priority under 35 U.S.C. §119 to Swedish Patent Application No. 0900865-7, filed on Jun. 24, 2009, which is incorporated by reference herein in its entirety.

FIELD OF THE INVENTION

The present invention relates generally to a tool for chip removing machining, including a basic body having an insert seat, and an indexable cutting insert fixed in the seat. The insert includes an upperside, an underside, a pair of side contact surfaces, two cutting edges that individually extend along a chip surface included in one of the upperside and underside, at least two heads that are spaced-apart via an intermediate part and individually include a front portion having at least one cutting edge and a rear portion along which the pair of side contact surfaces are formed. The insert seat of the basic body includes a central hollow space, and a front cavity and at least one rear cavity in which the heads of the cutting insert are housed, the front cavity including a pair of side support surfaces against which the pair of side contact surfaces of the cutting insert are pressed when a tightening element pulls the head rearward toward the side support surfaces. The invention also relates an indexable cutting insert and a basic body as such.

BACKGROUND OF THE INVENTION

Cutting tools of the kind in question are suitable for chip removing or cutting machining of workpieces of metal, such as steel, cast iron, aluminium, titanium, yellow metals, etc. The tools may also be used for the machining of composite materials of different types.

In practical production, the basic bodies and the replaceable cutting inserts for cutting tools are produced in two processes separated from each other and from materials having different properties. Usually, the basic body is manufactured from a solid steel body, in which the forming of the seat receiving the cutting insert is carried out by cutting machining, above all milling and drilling. By modern technique, this machining can be effected with very high accuracy in so far that the surfaces that delimit the seat and that ultimately determine the spatial position of the cutting insert, can be formed and located in a meticulously accurate way.

Also the cutting insert, which is a replaceable wear part, is traditionally given the form of a solid body of a homogeneous material that is considerably harder and more wear-resistant than the steel of the basic body. Most common in today's series manufactured cutting inserts is cemented carbide, which is a powder metallurgical material composed of one or more extremely hard carbides (e.g., WC, TiC, TaC and NbC) in a binder metal (usually Co). In a dry state, a powder mixture of selected components is compression-moulded while forming a green ware, which is later sintered while forming a usable cutting body (the dimensions of which all-around shrink approx. 18% in relation to the dimensions of the green ware). Similarly, the cutting inserts may also be manufactured from other materials than cemented carbide, e.g., cermet, ceramics, etc. It should also be mentioned that the finished cutting inserts may be coated as well as uncoated.

Within the field of cutting machining, there is a continuous development with the purpose of making not only the capacity of the tools to carry out the machining in a fast and accurate way more effective, but also the manufacture of the different parts of the tools in the form of basic bodies and replaceable cutting inserts. One trend is to improve the machining results in respect of the precision and surface finish, something which requires that the active cutting edge of the cutting insert obtains an exact, predetermined spatial position in relation to the rear fixing part of the basic body. In many applications, the requirements of positional precision are extreme. In today's cutting tools, generally a positional precision of the cutting edge is therefore aimed at which is counted in thousandths of a millimeter rather than in tenths. Another trend is to reduce the costs of the manufacture of the tools. This has, among other things, led to the fact that the cutting inserts manufactured from cemented carbide, which is most common on the market, already in connection with the compression-moulding or casting and sintering have received a better and better dimensional accuracy. To obtain good precision in the cutting inserts, it was earlier always necessary to subject the same to expensive grinding operations, but by the improved moulding and sintering technique, it has become possible to use directly pressed, i.e., unground cutting inserts to an ever greater extent. However, the development has not progressed further than that the tool designer still has to allow for a dimensional variation in the order of ±0.5% of the nominal dimensions of the cutting insert. This means that the active cutting edge of the cutting insert may very well end up in the desired position in the seat, when the outcome from the cutting insert production is good, but when the outcome is poorer (so far that the cutting insert has swollen and become longer, or shrunk and become shorter than intended), the position of the cutting edge in relation to the seat of the basic body may deviate to such a high extent from the desired position that the machining precision becomes less good.

In previously known cutting tools, the exact position of the active, front cutting edge was determined by the distance between the active cutting edge and two inactive clearance surfaces, positioned on the rear part of the cutting insert, which served as side contact surfaces and were pressed against a pair of co-operating, rear side support surfaces in the seat or insert seat of the basic body. When the rear clearance surfaces of the cutting insert form the reference point that determines the space position of the front, active cutting edge, the position precision of the cutting edge could become unacceptable if the cutting insert was not ground, because the distance between the active cutting edge and the opposite clearance surfaces could be considerable, in particular when the tools and the cutting inserts are large. In order to solve this problem, so-called serration connecting surfaces have—in particular for milling tools—been developed for holding the cutting inserts. Examples of such serration connecting surfaces in the interface between the cutting insert and the seat in the basic body are disclosed in, for example, WO2005/072898 and EP 1 795 288.

In certain tools, e.g., turning tools, serration connecting surfaces are, however, not suitable for different reasons, e.g., when it is desirable to make the turning inserts double-sided with the purpose of doubling the number of usable cutting edges. Another reason is that machining of a serration connecting surface in the seat of the basic body may be difficult and expensive to carry out, in particular when the turning inserts and thereby the seats are small.

A known turning tool is disclosed in U.S. Pat. No. 4,632, 606. A theoretical merit with this tool is that the cutting body thereof does not require support via rear side contact surfaces against side support surfaces situated deep inside the seat of the basic body. Thus, the cutting body is, along two opposite long sides, formed with a pair of side contact surfaces, situated near an active cutting edge, which converge in the backward direction toward an intermediate part of the cutting body and are pressed against a pair of forwardly diverging side support surfaces in the seat. However, this merit is only theoretical so far that the location of the side contact surfaces situated far in the front or near the active cutting edge in no way guarantees an exact spatial location of the cutting edge in relation to the rear fixing part of the basic body. Thus, there are several sources of error between the rear fixing part of the basic body and the active, front cutting edge of the cutting body. A first source of error arises as a consequence of the fact that the seat for the cutting body is formed in a separate supplementary plate, which afterwards—via pins in co-operation with agglutination or welding—is fixed on top of a plane upperside of the basic body of the tool. Therefore, already in the basic body, a risk arises that the exact position of the seat—and thereby of the turning insert—in relation to the rear fixing part may go lost, namely if the tolerances of the pins and the holes of the basic body co-operating with the same become poor. In contrast to such countersunk seats that in modern cutting tools are formed by cutting or chip removing machining directly in the steel material of the basic body, the seat in the tool known by U.S. Pat. No. 4,632,606 runs in addition the risk of being dislodged from its initial position, if the turning insert during operation is subjected to great stresses. Another source of error may be that the proper cutting body is composed of a plurality of different parts, viz. a central carrier typically of steel and two inserts of a hard material, such as cemented carbide, ceramics or diamond, applied to the same by soldering or welding. This means that the two hard and chip-removing cutting inserts individually may obtain an erroneous (and differing) position in relation to the central carrier already in connection with the manufacture of the cutting body. Because the carrier of the cutting body and the two separate inserts are formed of different materials, which may have different coefficients of thermal expansion, the risk of another source of error furthermore arises. For example, the material in the carrier, e.g., steel, has a greater coefficient of thermal expansion than the material in the inserts. When heat is generated during the cutting process, then the material in the carrier will be expanded and displace the cutting edge of the individual insert in relation to the side contact surfaces being behind, more precisely in such a way that the distance between the cutting edge and the side contact surfaces is enlarged.

The present invention aims at managing problems of the type that may arise in such modern cutting tools that make use of unground cutting inserts of above all cemented carbide, more precisely by providing a cutting tool the cutting inserts of which should be possible to manufacture by direct pressing, without needing any complicating and price rising connecting surfaces to give the cutting edges a good, repeatable position precision. In other words, it should be possible to fix the cutting insert in a reliable way and support the same along side contact surfaces thereof, without possible form defects during the manufacture jeopardizing the position precision of the cutting edges.

Another object of the invention is to provide a cutting tool, the cutting inserts of which are double-sided and thereby afford the user a great (doubled) number of cutting edges. Furthermore, the cutting inserts of the tool should, in spite of the indexability thereof, always be possible to be retained in a reliable and stable way in the appurtenant seat in the basic body of the tool, among other things in so far that each tendency of the cutting insert to rise (i.e., partially lose the contact with the bottom of the seat) is efficiently counteracted. Neither should the cutting insert be able to turn in the seat.

An additional object is to provide a cutting tool, the means of which for the fixation of the cutting insert should be possible to embody in various ways to fit different applications. Thus, the fixation means should be selectable among: screws, clamps, levers and wedges. Furthermore, it should be possible to carry out the manufacture of the basic body as well as the replaceable cutting inserts in series in an expedient way in order to reduce the tool costs to a minimum. In other words, the basic body and the cutting insert should individually be producible from solid bodies in a single piece without the need of price rising finishing.

SUMMARY OF THE INVENTION

In an embodiment, the invention provides a tool for chip removing machining, including a basic body having an insert seat, and an indexable cutting insert fixed in the seat. The insert includes an upperside, an underside, a pair of side contact surfaces, two cutting edges that individually extend along a chip surface included in one of the upperside and underside, at least two heads that are spaced-apart via an intermediate part and individually include a front portion having at least one cutting edge and a rear portion along which the pair of side contact surfaces are formed. The insert seat of the basic body includes a central hollow space, and a front cavity and at least one rear cavity in which the heads of the cutting insert are housed, the front cavity including a pair of side support surfaces against which the pair of side contact surfaces of the cutting insert are pressed when a tightening element pulls the head rearward toward the side support surfaces. The basic body is solid by being formed integrally of steel material. The seat is countersunk in the basic body such that the side support surfaces are integrated in the steel material. The cutting insert is formed integrally from a second, hard-wearing material having at least the same hardness as cemented carbide, the pair of side contact surfaces of the insert being integrated in the second material.

In another embodiment, the invention provides an indexable cutting insert for chip removing machining, including an upperside, an underside, a pair of side contact surfaces, two cutting edges that individually extend along a chip surface included in one of the upperside and underside, and at least two heads that are spaced-apart via an intermediate part and individually include a front portion having at least one cutting edge and a rear portion, in which the two side contact surfaces are included. The insert in its entirety is formed of a material having at least the same hardness as cemented carbide.

In yet another embodiment, the invention provides a basic body for tools for chip removing machining, including an insert seat including a central hollow space, and a front cavity and at least one rear cavity in which heads of a replaceable cutting insert are received, the front cavity being delimited by two side support surfaces against which a pair of side contact surfaces of the cutting insert are pressed when the insert is fixed in the seat. The basic body is solid by being formed integrally of steel material, and the seat is countersunk in the basic body such that the side support surfaces are integrated in the steel material.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

In this document, the concepts "upperside" and "underside" are used to create conceptual clarity and simplify the description of the cutting insert. These concepts are literally relevant when a cutting insert is single sided, i.e., includes cutting edges only along the periphery of the upperside. When the cutting insert (in its most preferred embodiment) is double-sided and includes cutting edges along the upperside as well as the underside, any one of the upperside and the underside can, however, be turned upward in the basic body of the tool.

By the concept "cavity", one of a plurality of relatively small recesses or hollows should be understood, which together with a common, central hollow space in the basic body of the tool forms a seat in which the cutting insert can be placed. Each such cavity has the purpose of housing a head formed in the cutting insert irrespective of whether a cutting edge included in the same is active or not.

Although the invention could be applicable to cutting tools in general, the same is particularly suitable for turning tools. For this reason, the invention is shown and described in connection with a tool for turning.

Figure 1:
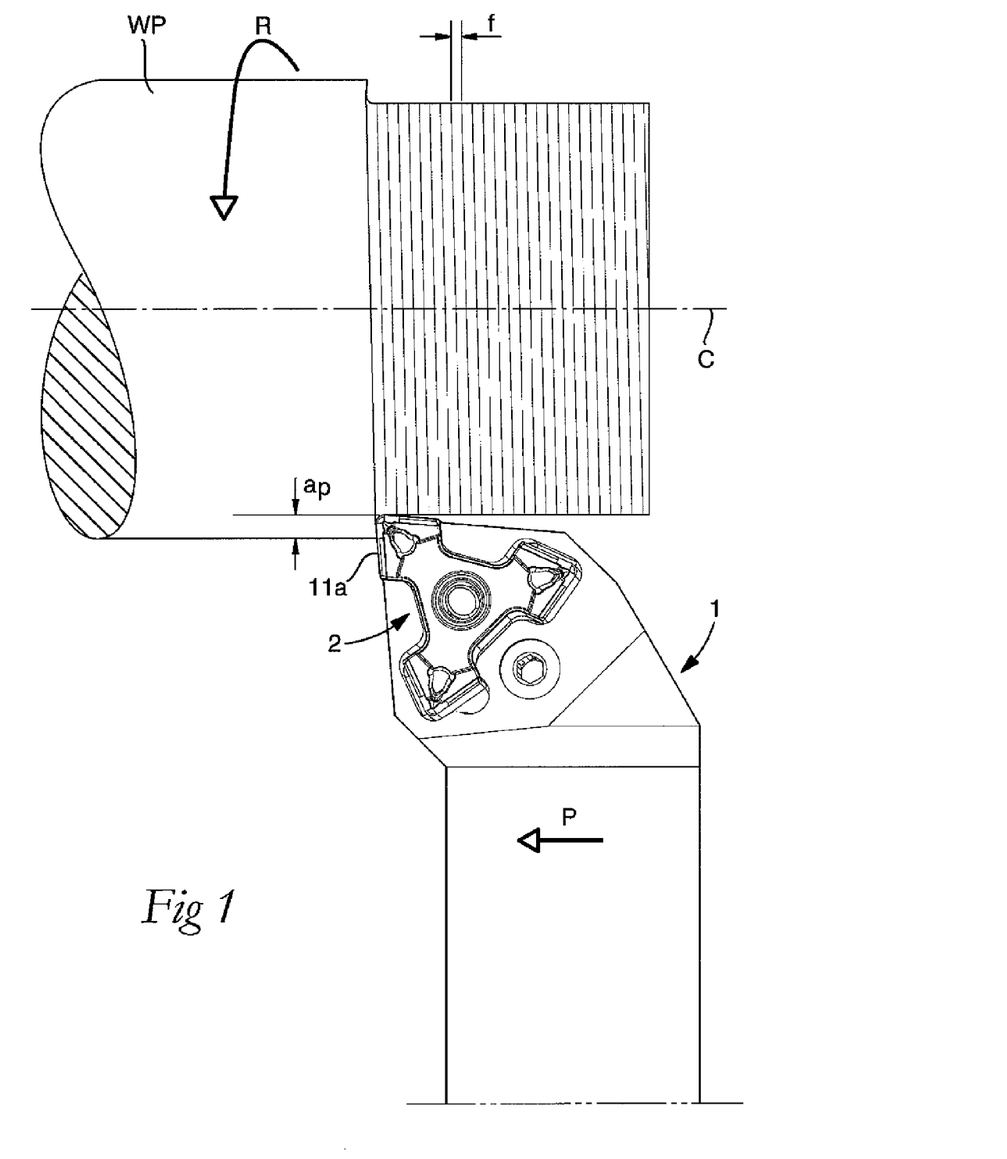
FIG. 1 is a view from above of a turning tool, made in accordance with an embodiment of the invention, during the machining of a workpiece.
Figure 2:
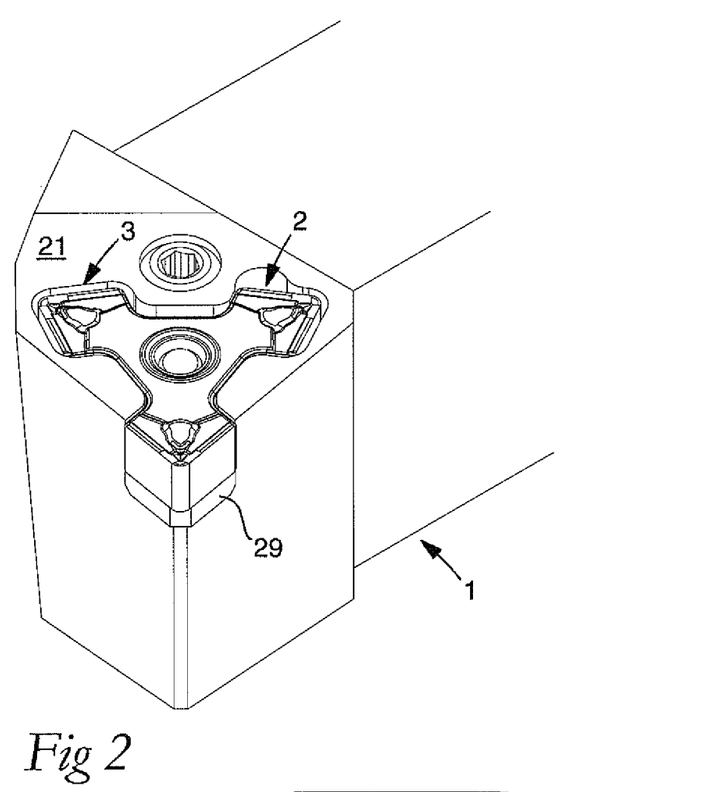
FIG. 2 is a partial perspective view of the same tool.
Figure 3:
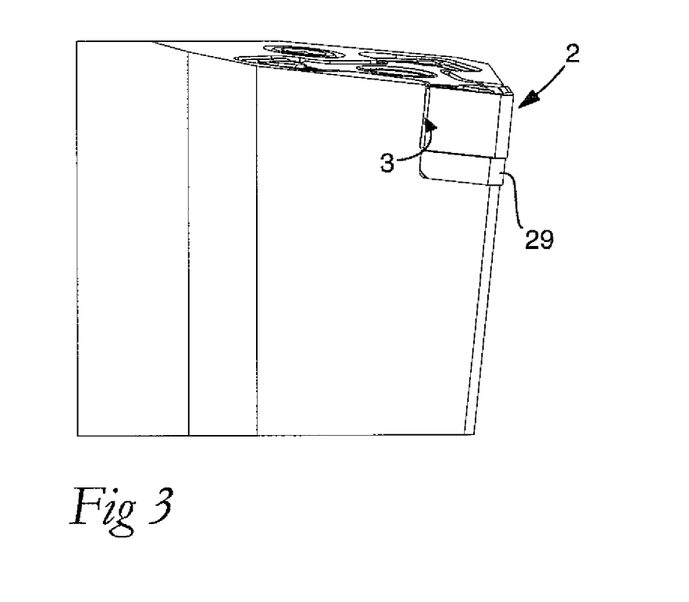
FIG. 3 is a front view of the tool.

In FIG. 1, a turning tool is shown, which includes a solid basic body or holder 1 and an indexable turning insert 2. A workpiece WP, e.g., a shaft or the like, is rotatable around a center axis C, more precisely in the direction of the arrow R. Usually, the workpiece is clamped in a rotatable chuck, while the tool is movable along the workpiece, e.g., linearly and parallel to the center axis C. The linear feeding direction between the tool and the workpiece is indicated by the arrow P. The feeding of the tool is designated f, while the cutting depth is designated ap.

The turning insert 2 is mounted in a seat 3 in the basic body (see FIGS. 2-5). A tightening element or device 4 also belongs to the basic body for the fixation of the turning insert in the seat, as well as—in this case—a shim plate 29 under the turning insert.

Reference is now made to FIGS. 6-9, which illustrate how the individual turning insert 2 comprises an upperside 5, an underside 6 and a circumferential side-limiting surface in which a plurality of part surfaces are included, which will be described in more detail below. Between the uppersides and undersides 5, 6, a through hole 7 extends, the center axis C1 of which forms a geometrical locus in which the tightening element 4 can apply a tightening force to the turning insert.

The turning insert includes a number of heads 8, which are mutually separated, and which individually include a front portion 10 (see FIG. 7), in which at least one cutting edge 11 is included, as well as a rear portion 12, in which a pair of co-operating side contact surfaces 13 are included. In the shown, preferred embodiment, the turning insert 2 includes three such heads 8, which are formed on three equiangularly spaced-apart arms 14, which protrude radially from an intermediate part of the turning insert, more precisely in the form of the cylindrical part of the turning insert that is present inside the inscribed circle designated by 15.

In the example shown, the turning insert is double-sided or invertible so far that each head 8 includes cutting edges 11 along the upperside 5 as well as the underside 6. In other words, the turning insert includes in total six alternately usable cutting edges. Each such cutting edge 11 is formed between, on one hand, an upperside or underside, and, on the other hand, a clearance surface 16 that extends between the uppersides and undersides. This means that the clearance surface 16 in this case is common to the two cutting edges 11 of the individual head. It should also be pointed out that the part of the upperside (or the underside) that is included in the front portion 10 of the head forms a chip surface against which the removed chips beat or move before they are disintegrated. In the example, each cutting edge 11 is V-shaped and includes two essentially straight part edges 11a, which converge into a common corner edge or nose edge 11b having a convex shape.

In accordance with a preferred embodiment of the invention, the two side contact surfaces 13 converge along the rear portion 12 of the individual head 8, more precisely in the backward direction toward the intermediate part 15 of the turning insert. The angle of convergence α (see FIG. 7) between the side contact surfaces 13 should amount to at least 70° and at most 90°. Suitably, the angle α is within the range of 75-85° and may advantageously be essentially as great as the angle of convergence (lacks designation) between the part edges 11a. In the example shown, the last-mentioned angle as well as the angle α amount to 80°.

Via concave part surfaces 17, the side contact surfaces 13 of two adjacent heads transform into a common intermediate surface 18, which in this case is plane. In total, the turning insert includes three such intermediate surfaces 18, which are individually tangent to the inscribed circle 15 that constitutes the intermediate part of the turning insert. It should, in addition, be noted that the individual arm 14, which carries a head 8, tapers in the direction from the intermediate part 15 toward the head 8.

Figure 7:
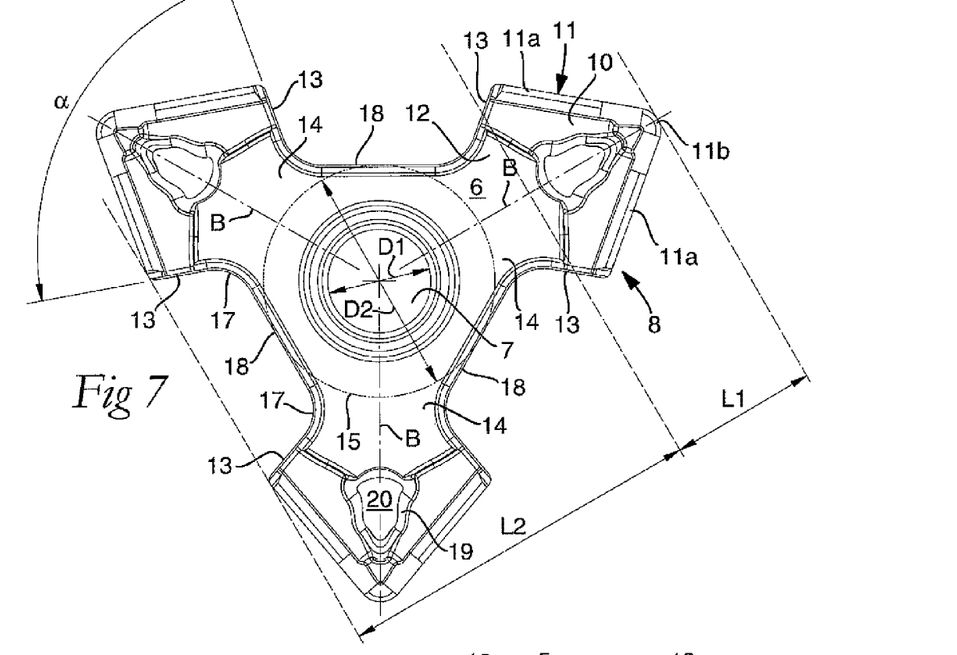
FIG. 7 is a planar view of the turning insert, as viewed from below.

By the design of the turning insert shown in FIG. 7, which is distinguished by the fact that the three intermediate surfaces 18 run along the sides of an imaginary, equilateral triangle, conditions are provided to give the hole 7 an ample diameter and in spite of this ensure sufficient strength in the intermediate part of the turning insert. In practice, the diameter D1 of the hole 7 should not be more than 50% of the diameter D2 of the inscribed circle 15. In the example, D1 amounts to approx. 46% of D2. In spite of the fact that a fairly sturdy tightening element can be applied in the hole 7, there is enough material in the ring-shaped portion between the hole 7 and the inscribed circle 15 in order for the intermediate part of the turning insert to be able to resist the stresses that the turning insert is subjected to during chip removing machining.

Figure 8:
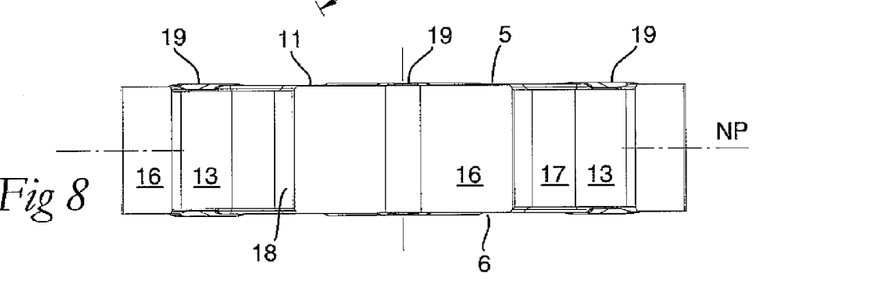
FIG. 8 is a side view of the turning insert.
Figure 9:
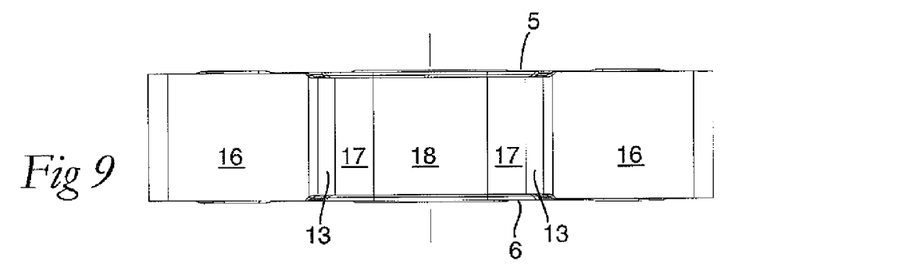
FIG. 9 is another side view of the turning insert.
Figure 10:
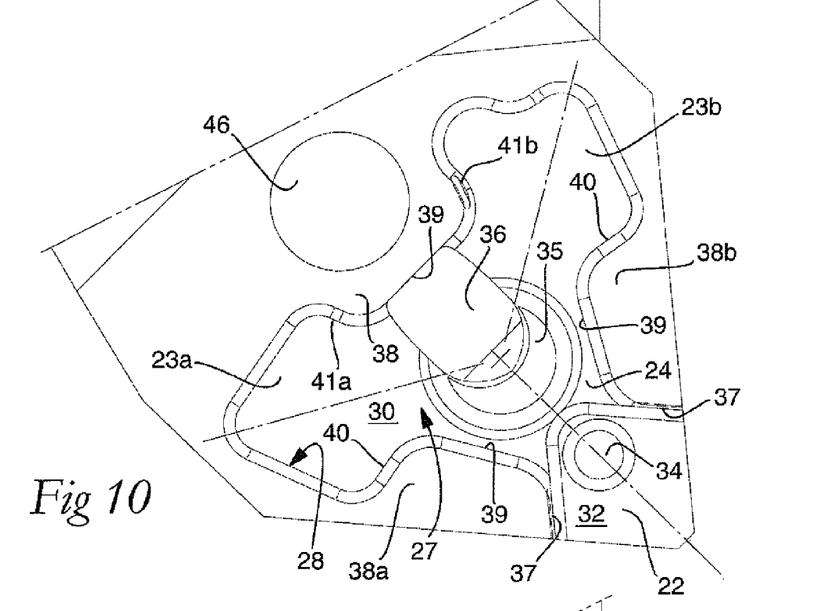
FIG. 10 is a planar view showing the shape of a seat in the basic body.

In FIG. 8, NP designates a neutral plane that is parallel to the uppersides and undersides 5, 6 and situated halfway therebetween. Because the turning insert is double-sided in order to be invertible, the upper and lower parts or halves of the turning insert on both sides of the neutral plane NP have an identical shape.

On the upperside 5 as well as the underside 6, there are a number of supporting shoulders 19, which individually include an abutment surface 20 that advantageously is plane. The number of supporting shoulders is most suitably three. Each such supporting shoulder 19 is situated at as a great radial distance from the center axis C1 as possible, more precisely by being located along the front portion 10 of the head that includes the cutting edges 11. This means that the side contact surfaces 13 are situated not only behind the cutting edges 11, but also behind the supporting shoulders 19. The abutment surfaces 20 of the three supporting shoulders are situated in a common plane that is located on a higher level than the cutting edges along the same side (the upperside or the underside). In other words, the axial distance between the neutral plane NP and the abutment surfaces 20 is somewhat greater than the axial distance between the individual cutting edge 11 and the neutral plane NP. In such a way, the turning insert can rest against the bottom of the seat 3 without the downwardly facing cutting edges contacting the same.

In FIG. 7, B designates bisectors of the three heads and arms, respectively, that are included in the turning insert. Because the arms 14 are equiangularly spaced-apart, these bisectors form an angle of 120° with each other. It should also be mentioned that the clearance surface 16 in this case includes three part surfaces (lacks designation), viz. two plane surfaces adjacent to the straight part edges 11a and a convex part surface adjacent to the nose edge 11b.

Reference is now made to FIGS. 4, 5, 10 and 11, which illustrate the nature of the seat 3, in which the turning insert 2 is mounted. Generally, the seat 3 has the shape of a trident-shaped recess in the upperside 21 of the solid basic body 1. In this recess, three spaced-apart cavities 22, 23a, 23b as well as a central, hollow space 24 are included, which space is common to the cavities so far that these open toward the same. The cavity 22 forms a front cavity, which is situated adjacent to a corner 25 between two side-limiting surfaces 26a, 26b (see FIG. 4) that are included in the basic body 1 and converge toward the corner. The two cavities 23a, 23b form rear cavities that have the purpose of housing the two heads 8, the cutting edges of which are inactive. The head 8 on which a cutting edge should be used is located in the front cavity 22. In its entirety, the seat 3 is delimited by a bottom 27 as well as a continuous side-limiting surface generally designated 28 (see FIG. 10), in which a plurality of part surfaces are included. In the example, a separate shim plate 29 is mounted in the front cavity 22, which plate advantageously is manufactured from cemented carbide or another material that is harder and more resistant than the material in the basic body 1 (usually steel). By the existence of the shim plate 29, the bottom 27 of the seat will be formed by, on one hand, a plane main surface 30, which extends from the rear cavities 23a, 23b toward the front cavity 22, and on the other hand a plane upperside 31 (see FIG. 5) of the shim plate 29. The shim plate is placed on a front, countersunk bearing surface 32 and is kept in place by a slip-spring pin 33, which is inserted into a hole 34 that mouths in the bearing surface 32. In the main surface 30 of the bottom 27, a central hole 35 mouths that at the rear transforms into a polygonally shaped recess 36.

In the side-limiting surface 28 of the seat, two side support surfaces 37 are included, which delimit the front cavity 22 and which converge toward the central hollow space 24 of the seat. The angle of convergence between the side support surfaces 37 is advantageously as great as the angle of convergence a between the side contact surfaces 13 of the turning insert. However, within the scope of the invention, it is possible that the respective angles of convergence are made differently great, more precisely in such a way that the angle between the side support surfaces 37 is selected somewhat smaller than the angle of convergence a of the turning insert. In such a way, the contact between the co-operating pairs of surfaces will, at least initially, be established at a maximum distance from the centers of the turning insert and the seat, respectively. In analogy with what has been said above concerning the angle of convergence a of the side contact surfaces 13, the angle between the side support surfaces 37 may advantageously amount to at most 90° and at least 70°, and suitably be within the range of 75-85°.

The cavities 22, 23a, 23b are mutually spaced-apart by three shoulders or indentations 38, 38a, 38b, each one of which is delimited by a front surface 39 and two side surfaces. On each one of the shoulders 38a, 38b, one of the side surfaces includes the surfaces 37 that are included in the front cavity 22 and form side support surfaces for the front head of the turning insert, while the opposite side surface 40 forms a part of each rear cavity 23a, 23b. The rear or inner shoulder 38 includes, in addition to the front surface 39, two opposite side surfaces 41a, 41b.

The bisectors B of the three cavities 22, 23a, 23b form—like the corresponding bisectors of the turning insert 2—an angle of 120° with each other. The two rear cavities 23a, 23b are generally somewhat greater or wider than the two inactive heads of the turning insert to be housed therein. However, the contour shapes of the two rear cavities are not entirely identical in that the side surface 41b of the shoulder 38 projects somewhat longer into the appurtenant cavity 23b than the opposite side surface 41a into the cavity 23a. In other words, the side surface 41b is situated closer to its bisector B than the side surface 41a is to its bisector. In such a way, the surface 41b will form a support surface or support point against which a rear, inactive head 8 on the turning insert can rest, while, however, the side surface 41a clears the turning insert. Here, it should be observed that the support point formed by surface 41b is facing the same direction as the chip-removing part edge 11a of the turning insert (see FIG. 1).

Figure 11:
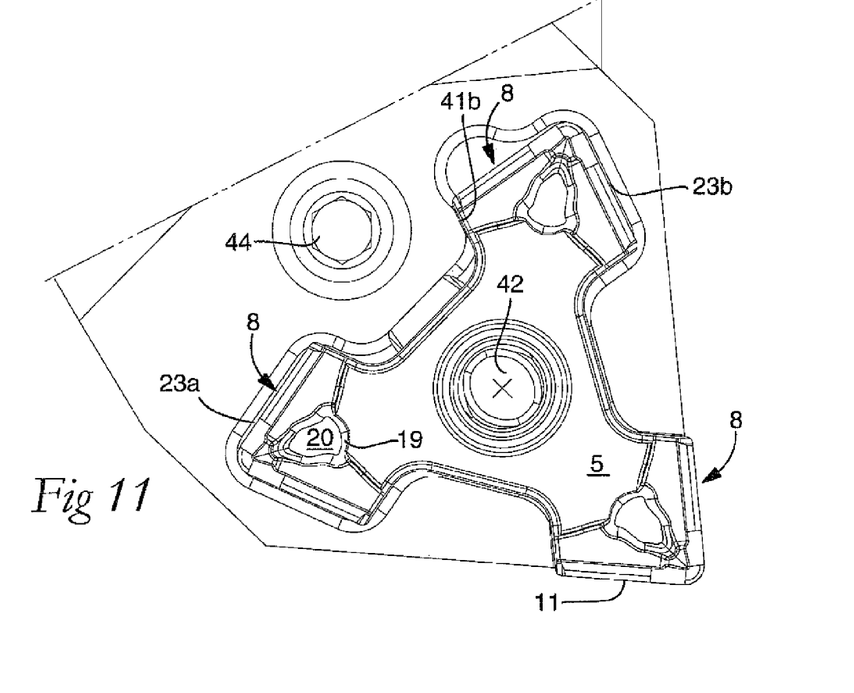
FIG. 11 is an analogous planar view showing the turning insert mounted in the seat.

When the turning insert is mounted in the seat in the way shown in FIG. 11, the same will have contact with the seat in six different spots. Two of these contact spots are the side contact surfaces 13, which are kept pressed against the two side support surfaces 37 of the front cavity 22. Three further contact spots are the supporting shoulders 19 of the downwardly facing underside of the turning insert. More precisely, the plane surfaces 20 of the three supporting shoulders abut against the bottom 27 of the seat. When the basic body, as is the case in the example shown, includes a shim plate, the front shoulder 19 of the turning insert will abut against the upperside 31 of the shim plate 29, while the two rear supporting shoulders abut against the main surface 30 of the seat bottom. The sixth contact spot is a side contact surface 13 that is positioned on an inactive head and pressed against the side support point 41b to guide the turning insert. In other respects, the turning insert lacks contact with the seat.

Figures 4, 5:
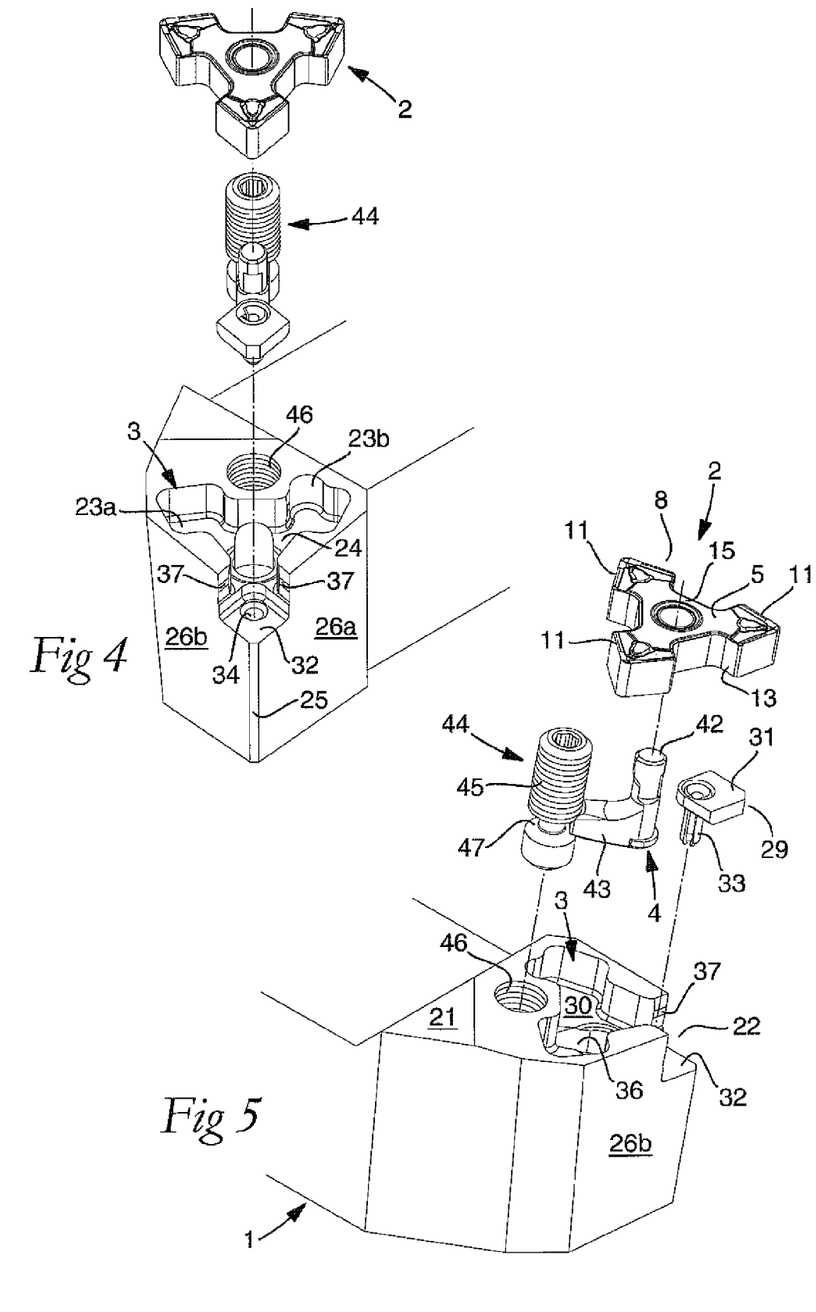
FIG. 4 is a perspective exploded view in which the cutting or turning insert of the tool has been removed from an appurtenant seat in a basic body.
FIG. 5 is an additional exploded view showing the basic body of the tool and the turning insert at another angle.
Figure 6:
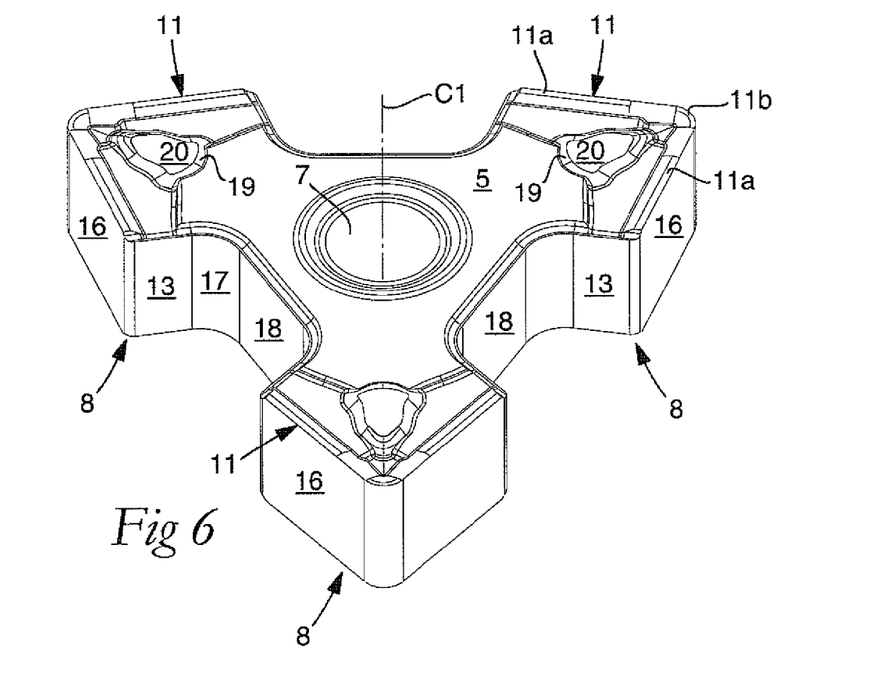
FIG. 6 is an enlarged top side perspective view of only the proper turning insert.

As is seen in FIGS. 4 and 5, the tightening element 4 of the basic body is, in this case, a lever that is brought down into the recess 36 and the hole 35, and that includes a vertical driving pin 42 as well as a horizontal fork 43. This lever 4 co-operates with a screw 44 that includes a male thread 45, which is in engagement with a female thread in a rear hole 46, which mouths in the upperside 21 of the basic body. In the screw 44, there is a ring-shaped groove 47 into which the fork 43 engages. By screwing the screw 44 inward or outward in the hole 46, the pin 42 is brought to tilt rearward or forward in relation to the seat. When the screw is brought downward in the hole 46, the pin 42 tilts rearward and applies a rearwardly directed tensile force to the turning insert, which force presses the two side contact surfaces 13 of the active head 8 against the side support surfaces 37 in the front cavity 22 of the seat. When the screw 44 is screwed in the upward direction in the hole 46, the pin 42 tilts forward to detach the turning insert and allow indexing, inversion or replacement of the same.

In the shown preferred embodiment, the depth of the seat 3 (equal to the level difference between the surfaces 21 and 30) is approximately as great as the thickness of the turning insert 2. Therefore, in the mounted state of the turning insert (see FIGS. 2 and 3), the upperside of the turning insert will be located approximately flush with the surface 21 of the basic body.

In the shown, preferred embodiment of the tool, the basic body 1 is solid, i.e., manufactured in a single piece, more precisely from a blank of a first material, which advantageously is steel. In doing so, the seat 3 is countersunk in the surface 21 and formed by chip removing machining directly in the workpiece, e.g., by milling and/or drilling. This means, among other things that the two side support surfaces 37 are integrated in the basic body and always get a predetermined and exact position in relation to the rear fixing part thereof (not shown). Also the turning insert is in the form of a solid or integrally manufactured body, however of a second material that is harder, more stable in shape and more wear-resistant than the steel of the basic body. Primarily, the turning insert is manufactured in the traditional way from cemented carbide, although also other hard and wear-resistant materials are possible provided that they have at least the same hardness as cemented carbide. The fact that the turning insert 2 is solid means, among other things, that the chip surface, against which the chips slide and are disintegrated and which extends not only in the immediate vicinity of the nose edge 11b but all the way to the side contact surfaces 13, is included in one and the same material, viz. cemented carbide or the like. In other words, the spatial position of the nose edge in relation to the intermediate part of the turning insert cannot be affected detrimentally by any differentiating thermal expansion phenomena.

An advantage of the invention—in comparison with known tools that make use of solid cemented carbide inserts—is that possible form defects (swelling and shrinkage, respectively) in the turning insert get a negligible effect on the exact position of the cutting edge in the assembled tool, because the two side contact surfaces 13, which are pressed against the two force-absorbing side support surfaces 37 of the seat, are situated very near the nose edge 1b. The negative impact of the form defects on the position of the nose edge 11b is therefore limited to the short—in comparison with the distance L2—radial distance L1 between the nose edge and the two side contact surfaces 13. In comparison with the tool according to U.S. Pat. No. 4,632,606, the invention affords the decisive advantage that the number of possible sources of error is reduced to just one, viz. the risk of temporary arising form defects in the turning inserts during the manufacture thereof. Thus, the exact location of the side support surfaces of the seat according to the invention in relation to the fixing part of the basic body is very reliable because the side support surfaces are directly integrated in the material of the basic body. In this connection, it should also be noted that the two hard, chip-removing turning inserts in the cutting body of the known tool in practice will require finishing in the form of precision grinding to make the cutting body usable at all.

Figure 12:
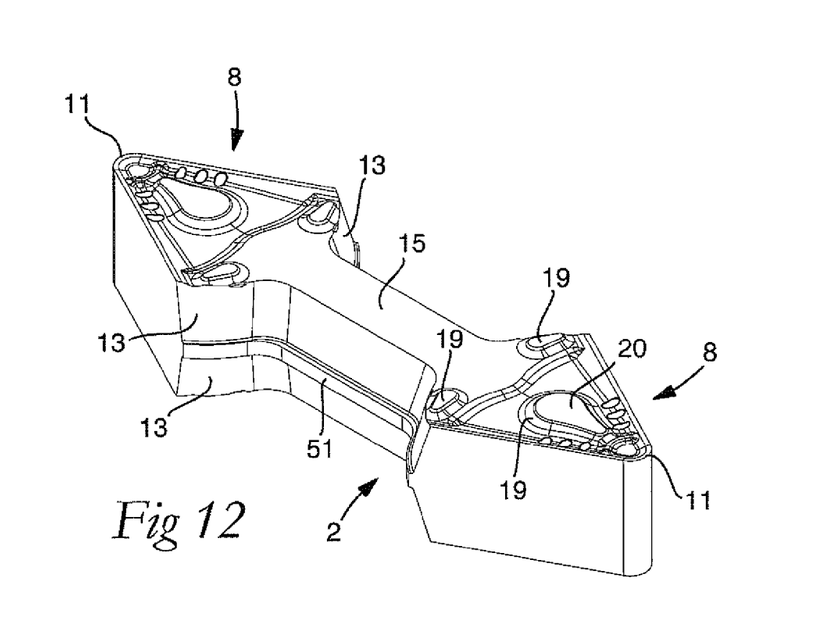
FIG. 12 is a perspective view showing an alternative embodiment of a turning insert according to the invention.

In FIG. 12 (see sheet 4/6), an alternative embodiment is shown, in which the turning insert 2 is formed with only two heads 8, which individually include a front cutting edge 11 and a number of side contact surfaces 13 located behind the same. Between these heads 8, a long narrow intermediate part 15 extends. Also in this case, the turning insert is double-sided and invertible. It should be particularly noted that the turning insert in this case lacks any through hole, and therefore the same is clamped in the appurtenant seat (not shown) by clamps or the like.

In contrast to the previously described, three-armed turning insert, the individual head 8 of the turning insert according to FIG. 12 is formed with side contact surfaces 13 above as well as below the neutral plane of the turning insert, which is represented by a bulge 51. More precisely, each side contact surface 13 is inclined in relation to the neutral plane so far that the same extends obliquely downward/rearward from the appurtenant upperside or underside and forms an obtuse angle with the same. When the turning insert is mounted in an appurtenant seat, the two upper side contact surfaces 13 are intended to be pressed against a pair of side support surfaces (not shown), which are inclined in a corresponding way. When the turning insert in connection with the fixation thereof is subjected to a rearwardly directed tensile force, the inclination of the co-operating surfaces guarantees that the front, active head of the turning insert is simultaneously pressed downward against the bottom of the seat.

It should also be mentioned that the turning insert according to FIG. 12 includes three supporting shoulders 19 on each head 8. Of these, the front shoulder is centrally placed in the immediate vicinity of the front end or nose of the head, while the two rear supporting shoulders are axially spaced-apart from the front one as well as transversally spaced-apart from each other.

The invention is not limited to the embodiments described above and shown in the drawings. For instance, it is possible to make the turning insert single sided, i.e., with cutting edges only along the upperside of the turning insert. Instead of a lever or a screw, other tightening elements may furthermore be used, such as a clamp, a wedge, a yoke, an eccentric mechanism or the like. Furthermore, neither the side contact surfaces of the turning insert nor the side support surfaces of the seat need to be plane. Thus, one of these surfaces—alternatively both—may be slightly cambered, i.e., generally have a convex shape (as viewed either in planar view from above or horizontally from the side). As is indicated per se, e.g., in FIGS. 4 and 5, the side support surfaces of the seat do not necessarily need to extend all the way from the bottom of the seat to the surface in which the seat opens. In an analogous way, neither do the side contact surfaces of the turning insert need to extend all the way between the uppersides and undersides of the turning insert (see FIG. 12). Although converging side contact surfaces and side support surfaces of the type that has been shown in the drawings are preferred, it is also possible to form the same surfaces essentially right-angled in relation to the appurtenant bisector. The invention also affords the possibility of giving the cutting edges the most varying shape. Thus, instead of simple, V-shaped cutting edges, round (semicircular) or polygonal cutting edges may be used. Generally, the front portion of the individual head that is present in front of the side contact surfaces of the turning insert may accordingly be shaped in any way without deviating from the general idea of the invention. For special purposes, it is even possible to give the cutting edges mutually different shape. When extreme positional or indexing accuracy is desired, it is furthermore, possible to grind the side contact surfaces of the turning insert with great exactness in relation to the nose edge of the turning insert. However, such a grinding is limited to the diminutive surfaces that serve as side contact surfaces, while other parts of the periphery of the turning insert may be left unground. In the turning insert that is shown in FIG. 12, the inclined, wedge-like side contact surfaces are located along the upperside of the turning insert and form an obtuse angle with the same. However, it is also possible to accomplish the desired, downwardly pressing wedge action by side contact surfaces that are formed adjacent to the underside and form an acute angle with the same. It should also be mentioned that the invention also is applicable to other cutting tools than turning tools, e.g., milling tools.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising:
a basic body having an insert seat; and
an indexable cutting insert fixed in the seat;
the insert including an upperside, an underside, a pair of side contact surfaces, two cutting edges that individually extend along a chip surface included in one of the upperside and underside, at least two heads that are spaced-apart via an intermediate part and individually include a front portion having at least one cutting edge and a rear portion along which the pair of side contact surfaces are formed and a plurality of abutment surfaces having supporting shoulders on the upperside and on the underside;
the insert seat of the basic body including a central hollow space, and a front cavity and at least one rear cavity in which the heads of the cutting insert are housed, the front cavity including a pair of side support surfaces against which the pair of side contact surfaces of the cutting insert are pressed when a tightening element pulls the head rearward toward the side support surfaces, wherein
the basic body is solid by being formed integrally of steel material,
the seat is countersunk in the basic body such that the side support surfaces are integrated in the steel material, and
the cutting insert is formed integrally from a second, hard-wearing material having at least the same hardness as cemented carbide, the pair of side contact surfaces of the insert being integrated in the second material,
each head is spaced apart from a center axis along a bisector via an arm,
in planar view, each arm has a minimum width that is less than a maximum width of the corresponding head, each minimum width and maximum width determined perpendicular to the corresponding bisector, and
on each arm, the side contact surfaces are situated behind the cutting edges and behind the supporting shoulders of the abutment surfaces.

2. The tool according to claim 1, wherein
the cutting insert is double-sided so far that each head includes a cutting edge along the upperside as well as a cutting edge along the underside, and
the plurality of projecting supporting shoulders are formed having have abutment surfaces situated in a common plane that is located on a higher level than the cutting edges on the same side.

3. A tool for chip removing machining, comprising:
a basic body having an insert seat; and
an indexable cutting insert fixed in the seat;
the insert including an upperside, an underside, a pair of side contact surfaces, two cutting edges that individually extend along a chip surface included in one of the upperside and underside, at least two heads that are spaced-apart via an intermediate part and individually include a front portion having at least one cutting edge and a rear portion along which the pair of side contact surfaces are formed;
the insert seat of the basic body including a central hollow space, and a front cavity and at least one rear cavity in which the heads of the cutting insert are housed, the front cavity including a pair of side support surfaces against which the pair of side contact surfaces of the cutting insert are pressed when a tightening element pulls the head rearward toward the side support surfaces,
wherein the basic body is solid by being formed integrally of steel material,
wherein the seat is countersunk in the basic body such that the side support surfaces are integrated in the steel material,
wherein the cutting insert is formed integrally from a second, hard-wearing material having at least the same hardness as cemented carbide, the pair of side contact surfaces of the insert being integrated in the second material,
wherein the cutting insert comprises three heads formed on three equiangularly spaced-apart arms which protrude radially from the intermediate part of the cutting insert, and
wherein the seat of the basic body, in addition to the front cavity, includes two rear cavities, the cavities being mutually spaced-apart by shoulders that are delimited by a front surface and two side surfaces, all three cavities being equiangularly separated so far that imaginary bisectors through the respective cavities form an angle of 120° with each other.

4. The tool according to claim 3, wherein each arm of the cutting insert tapers in the direction from the intermediate part toward the head.

5. The tool according to claim 3, wherein side surfaces of two spaced-apart arms of the cutting insert transform into a common intermediate surface, which, together with two identical intermediate surfaces of the cutting insert, is tangent to an imaginary inscribed circle that forms the intermediate part of the cutting insert.

6. The tool according to claim 5, wherein the cutting insert comprises a through hole, which mouths in the upperside as well as the underside, and which constitutes a geometrical locus (Cl) for the application of a tightening force to the cutting insert, the hole having a diameter that amounts to at most half the diameter of the inscribed circle.

7. The tool according to claim 3, wherein
the shortest distance between a first side surface of the shoulder and the bisector of one of the rear cavities is greater than the shortest distance between the second side surface and the bisector of the other rear cavity, and
a side contact surface on a rear head of the cutting insert is pressed against the second side surface of the shoulder.

8. The tool according to claim 2, wherein
the two side support surfaces of the seat countersunk in the basic body extend perpendicular to the bottom, and
the pair of side contact surfaces of the cutting insert extend perpendicular to the upperside and underside of the cutting insert.

9. The tool according to claim 1, wherein a bottom of the seat includes a plane main surface, which extends from the rear cavity toward the front cavity, and a plane upperside of a shim plate in the front cavity.

10. An indexable cutting insert for chip removing machining, comprising:
an upperside;
an underside;
a pair of side contact surfaces;
two cutting edges that individually extend along a chip surface included in one of the upperside and underside;
at least two heads that are spaced-apart via an intermediate part and individually include a front portion having at least one cutting edge and a rear portion, in which the two side contact surfaces are included; and
a plurality of abutment surfaces having a plurality of supporting shoulders on the upperside and on the underside,
wherein the insert in its entirety is formed of a material having at least the same hardness as cemented carbide,
wherein each head is spaced apart from a center axis along a bisector via an arm,
wherein, in planar view, each arm has a minimum width that is less than a maximum width of the corresponding head, each minimum width and maximum width determined perpendicular to the corresponding bisector, and
wherein, on each arm, the side contact surfaces are situated behind the cutting edges and behind the supporting shoulders of the abutment surfaces.

11. The cutting insert according to claim 10, wherein
the insert is double-sided so far that each head includes a cutting edge along the upperside as well as a cutting edge along the underside, and
on the upperside as well as the underside, a number of projecting supporting shoulders are formed having abutment surfaces situated in a common plane that is located on a higher level than the cutting edges.

12. The cutting insert according to claim 10, wherein the insert comprises three heads formed on three equiangularly spaced-apart arms which protrude radially from the intermediate part of the cutting insert.

13. The cutting insert according to claim 12, wherein each arm tapers in the direction from the intermediate part toward the head.

14. The cutting insert according to claim 12, wherein side contact surfaces of two spaced-apart heads transform into a common intermediate surface, which, together with two identical intermediate surfaces, is tangent to an imaginary inscribed circle that forms the intermediate part of the cutting insert.

15. The cutting insert according to claim 14, wherein the cutting insert comprises a through hole, which mouths in the upperside as well as the underside, and which constitutes a central locus for the application of a tightening force to the cutting insert, the hole having a diameter that amounts to at most half the diameter of the inscribed circle.

16. The cutting insert according to claim 10, wherein the two side contact surfaces extend perpendicular to the upperside and underside.

17. The cutting insert according to claim 10, wherein each side contact surface is inclined in relation to at least one of the upperside and underside.

18. A basic body for tools for chip removing machining, comprising: an insert seat including a central hollow space, and a front cavity and at least one rear cavity in which heads of a replaceable cutting insert are received, the front cavity being delimited by two side support surfaces against which a pair of side contact surfaces of the cutting insert are pressed when the insert is fixed in the seat, wherein
the basic body is solid by being formed integrally of steel material, and
the seat is countersunk in the basic body such that the side support surfaces are integrated in the steel material.

19. The basic body according to claim 18, wherein a bottom of the seat includes a plane main surface, which extends from the rear cavity toward the front cavity, and a plane upperside of a shim plate in the front cavity.

20. A basic body for tools for chip removing machining, comprising:
an insert seat including a central hollow space, and a front cavity and at least one rear cavity in which heads of a replaceable cutting insert are received, the front cavity being delimited by two side support surfaces against which a pair of side contact surfaces of the cutting insert are pressed when the insert is fixed in the seat,
wherein the basic body is solid by being formed integrally of steel material,
wherein the seat is countersunk in the basic body such that the side support surfaces are integrated in the steel material, and
wherein the insert seat, in addition to the front cavity, includes two rear cavities which are mutually spaced-apart by a shoulder, the shoulder being delimited by a front surface and two side surfaces, all three cavities being equiangularly separated so far that imaginary bisectors through the respective cavities form an angle of 120° with each other.

21. The basic body according to claim 20, wherein the shortest distance between one side surface of the shoulder and the bisector of one of the cavities is greater than the shortest distance between the opposite side surface and the bisector of the other cavity.

22. The tool according to claim 1, wherein side surfaces of successive spaced-apart arms of the cutting insert transform into a common intermediate surface, which, together with two identical intermediate surfaces of the cutting insert, is tangent to an imaginary inscribed circle that forms the intermediate part of the cutting insert.

23. The tool according to claim 22, wherein the minimum width of each intermediate part is determined tangent to the inscribed circle.

24. The cutting insert according to claim 14, wherein the minimum width of each arm is determined tangent to the inscribed circle.

* * * * *